US 9,638,255 B2

(12) United States Patent
Arnault et al.

(10) Patent No.: US 9,638,255 B2
(45) Date of Patent: May 2, 2017

(54) ROLLING BEARING, IN PARTICULAR FOR A DECLUTCH THRUST DEVICE

(71) Applicants: Benoit Arnault, Saint-Cyr-sur-Loire (FR); Eric Baudez, Fondettes (FR); Mickael Chollet, Joué-lès-Tours (FR); Philippe Walter, Fondettes (FR)

(72) Inventors: Benoit Arnault, Saint-Cyr-sur-Loire (FR); Eric Baudez, Fondettes (FR); Mickael Chollet, Joué-lès-Tours (FR); Philippe Walter, Fondettes (FR)

(73) Assignee: AKTIEBOLAGET SKF, Gothenburg (SE)

( * ) Notice: Subject to any disclaimer, the term of this patent is extended or adjusted under 35 U.S.C. 154(b) by 81 days.

(21) Appl. No.: 14/695,869

(22) Filed: Apr. 24, 2015

(65) Prior Publication Data
US 2015/0308509 A1    Oct. 29, 2015

(30) Foreign Application Priority Data

Apr. 25, 2014  (FR) .................................... 14 53730

(51) Int. Cl.
| F16C 33/78 | (2006.01) |
| F16C 19/06 | (2006.01) |
| F16D 23/14 | (2006.01) |

(52) U.S. Cl.
CPC .......... *F16C 33/7896* (2013.01); *F16C 19/06* (2013.01); *F16C 33/7826* (2013.01); *F16C 33/7866* (2013.01); *F16C 33/7883* (2013.01); *F16C 33/7886* (2013.01); *F16C 33/7889* (2013.01); *F16D 23/14* (2013.01); *F16C 2361/43* (2013.01); *F16D 2300/08* (2013.01)

(58) Field of Classification Search
CPC .. F16C 33/7896; F16C 19/06; F16C 33/7826; F16C 33/7866; F16C 33/7883; F16C 33/7886; F16C 33/7889; F16C 23/14
See application file for complete search history.

(56) References Cited

U.S. PATENT DOCUMENTS

| 6,082,905 | A * | 7/2000 | Vignotto | F16C 33/7883 384/484 |
| 7,591,593 | B2 * | 9/2009 | Tsujimoto | F16C 33/7896 384/486 |
| 8,534,926 | B2 * | 9/2013 | Suzuki | F16C 19/163 192/98 |
| 2012/0263406 | A1 * | 10/2012 | Arnault | F16D 23/14 384/484 |

(Continued)

FOREIGN PATENT DOCUMENTS

| EP | 0902203 A1 | 3/1999 |
| EP | 2287486 A1 | 2/2011 |

(Continued)

*Primary Examiner* — Thomas R. Hannon
(74) *Attorney, Agent, or Firm* — Bryan Peckjian; SKF USA Inc. Patent Dept.

(57) ABSTRACT

A rolling bearing includes an inner race, an outer race, a row of rolling elements disposed between the inner and outer races, and a first seal fixed to one of the inner and outer races. The first seal includes at least one sealing lip cooperating with the other of the inner and outer races. The rolling bearing further includes a second seal fixed to the other of the inner and outer races. The first seal includes at least one sealing lip cooperating with the first seal.

13 Claims, 5 Drawing Sheets

(56) References Cited

U.S. PATENT DOCUMENTS

2015/0308516 A1* 10/2015 Arnault .................. F16D 23/14
                                                              192/110 B

FOREIGN PATENT DOCUMENTS

| EP | 2357371 A1 | 8/2011 |
| GB | 1254821 A | 11/1971 |
| JP | H03100622 U | 10/1991 |

* cited by examiner

ROLLING BEARING, IN PARTICULAR FOR A DECLUTCH THRUST DEVICE

CROSS REFERENCE TO RELATED APPLICATIONS

This is a Non-Provisional Patent Application, filed under the Paris Convention, claims the benefit of French Patent (FR) Application Number 1453730 filed on 25 Apr. 2014, which is incorporated herein by reference in its entirety.

FIELD OF THE INVENTION

The present invention concerns the field of rolling bearings, notably those used in clutch release bearing devices intended to act on the diaphragm of a clutch, in particular for motor vehicles.

BACKGROUND

Such devices include a rolling bearing one of the races of which turns and the other of which is fixed, the turning race being provided with a radial attack surface intended to come into contact with the end of a maneuvering member such as a diaphragm of the clutch, for example.

A non-turning maneuvering element supports the rolling bearing and, when acted on by a (mechanical, electrical or hydraulic) control member, moves the bearing axially to cause the attack surface of the turning race to press against the diaphragm of the clutch and actuate the clutch mechanism.

A self-centering or self-aligning sleeve is generally disposed between the inner race of the rolling bearing and the maneuvering element, said sleeve providing the axial connection between these two parts at the same time as, by virtue of its elasticity, allowing relative radial movement between them. The rolling bearing can therefore move in order to obtain radial alignment of the rotation axes of the bearing and the diaphragm so as to be self-centered on the latter. For more details of such a rolling bearing, see for example patent application FR-A1-2 883 347.

In the rolling bearing described in that document, there is provided a fixed seal on the outer race including a friction lip that rubs against a radial collar on the inner race.

Under some operating conditions, the seal of such a bearing can prove insufficient.

BRIEF DESCRIPTION OF THE INVENTION

The present invention aims to remedy this disadvantage.

To be more specific, the present invention aims to provide a rolling bearing, notably for a clutch release bearing device, exhibiting an improved seal and that is simple to manufacture and to assemble.

In one embodiment the rolling bearing includes an inner race, an outer race, at least one row of rolling elements disposed between said races, and at least one seal fixed to one of the races and including at least one sealing lip cooperating with the other race. The bearing further includes at least one second seal fixed to said other race and including at least one sealing lip cooperating with said first seal.

Said second seal is preferably situated axially on the side opposite the rolling elements and said race relative to said first seal.

Said first seal may advantageously further include a flange on which the sealing lip of said seal is disposed, the sealing lip of said second seal cooperating with said flange. The flange may include a radial or substantially radial portion extending in the direction of the other race, the sealing lip of said second seal cooperating with said portion of the flange.

The sealing lip of said first seal may cooperate with a first portion of the other race and said second seal may be fixed to a second portion of said other race that is separate from said first portion and situated axially facing the first seal.

In one embodiment, the first portion of the other race extends axially as is extended radially by the second portion forming a collar. The first portion may extend from a third portion delimiting a raceway for the rolling elements.

In one embodiment, the bore of said second seal includes a plurality of protuberances spaced from one another in the circumferential direction and each extending inside a complementary groove formed on the other race.

Said other race may include at least one radial lug delimiting a stop surface against which said second seal is mounted to bear axially.

In one embodiment, the sealing lip of said second seal cooperates by friction with said first seal. The sealing lip of said second seal may be mounted axially or radially in contact against said first seal.

In a preferred embodiment, said second seal is provided with a flexible gasket including the sealing lip and a rigid reinforcing insert covered at least in part by the flexible gasket.

The sealing lip of said second seal may include at least one wave.

In one embodiment, the bearing further includes an additional seal fixed to one of the races and including at least one sealing lip cooperating with the other race and disposed axially on the side opposite the first and second seals relative to the rolling elements. The bearing may include a self-centering sleeve mounted in the bore of the inner race and including said additional seal.

The invention also concerns a clutch release bearing device including a rolling bearing as defined above.

BRIEF DESCRIPTION OF THE DRAWINGS

The present invention will be better understood after reading the detailed description of embodiments given by way of nonlimiting example and shown in the appended drawings, in which.

Figure 1:
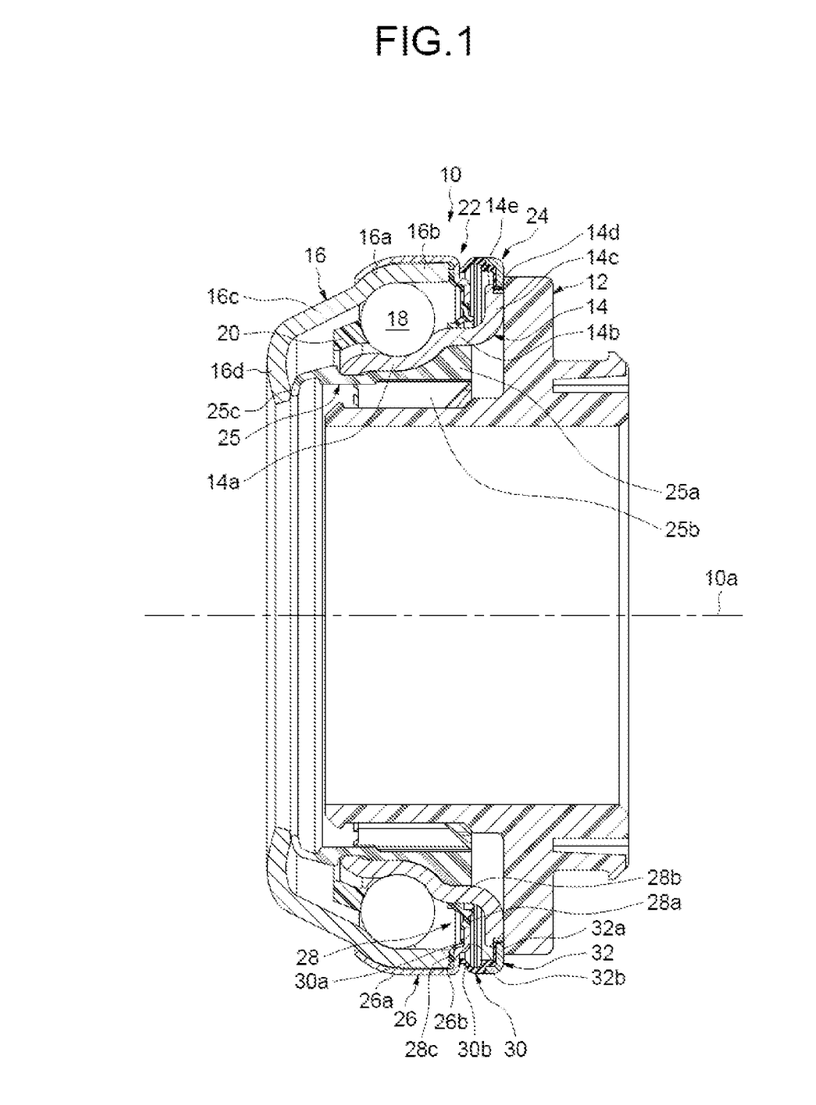
FIG. 1 is a view in axial section of a rolling bearing in accordance with a first embodiment of the invention.

FIG. 1 shows a rolling bearing 10 intended to be used in a clutch release bearing device provided to act on the diaphragm of a clutch, in particular for motor vehicles. The rolling bearing 10 is mounted on a maneuvering element 12 of the associated clutch release bearing device and is adapted to be moved axially relative to a guide tube (not represented).

DETAILED DESCRIPTION OF THE INVENTION

The rolling bearing 10, which has an axis 10a, includes a non-turning interior face 14, a turning outer race 16, a row of rolling elements 18, here taking the form of balls and mounted between said races, a cage 20 for maintaining the regular circumferential spacing of the rolling elements, a first annular seal 22 fixed to the outer race 16, and a second annular seal 24 fixed to the inner race 14, mounted behind the seal 22 and cooperating with said seal as will be described in greater detail below. In the embodiment shown, the bearing 10 also includes a self-aligning sleeve 25 mounted in the bore of the inner race 14. Alternatively, the bearing 10 may not include any such sleeve.

The thin-wall inner race 14, the axis of which is the axis 10a, can advantageously be made by pressing a steel plate or a steel tube. The inner race 14 is made in one piece. The inner race 14 includes a toroidal portion 14a having in cross section a quarter-circle concave internal profile forming a toroidal track or raceway for the rolling elements 18. The inner race 14 also includes an annular axial portion 14b extending a large-diameter edge of the toroidal portion 14a axially opposite the outer race 16, which is itself extended radially outward by a radial portion forming an annular collar 14c. The collar 14c is situated axially on the side opposite the toroidal portion 14a and the rolling elements 18 relative to the axial portion 14b. The collar 14c is mounted to bear axially against the maneuvering element 12 axially on the side opposite the outer race 16. The collar 14c is situated axially facing the seal 22.

The thin-wall outer race 16, the axis of which is the axis 10a, can also advantageously be made by pressing a steel plate or a steel tube. The outer race 16 is made in one piece. The outer race 16 includes a toroidal portion 16a having in cross section a quarter-circle concave internal profile forming a toroidal track or raceway for the rolling elements 18. The outer race 16 also includes an axial portion 16b extending a large-diameter edge of the toroidal portion 16a and radially surrounding the toroidal portion 14a of the inner race. The outer race 16 further includes a frustoconical portion 16c extending a small-diameter edge of the toroidal portion 16a axially opposite the axial portion 16b and an annular radial portion 16d extending the frustoconical portion 16c radially inward. The radial portion 16c is adapted to come axially into contact against a diaphragm of the clutch (not represented).

The retaining cage 20 is disposed radially between the toroidal portion 14a of the inner race and the frustoconical portion 16c of the outer race. The cage 20 is mounted axially between the rolling elements 18 and the radial portion 16d of the outer race.

The seal 22 includes an armature or flange 26 on which is disposed a gasket 28 made from a flexible material providing a dynamic seal with the inner race 14. By "dynamic seal" is meant a seal between two parts in relative motion.

The flange 26 is made from a rigid material, for example by pressing, cutting and bending a steel plate or a steel tube. Alternatively, the flange 26 may be made from a rigid synthetic material, for example polyamide. The generally annular flange 26 is fixed to the outer race 16. The flange 26 extends toward the inner race 14 and is situated in part axially facing the collar 14c of said race.

The flange 26 includes an annular axial portion 26a in radial contact against the exterior surface of the axial portion 16b of the outer race and extended by an edge (not referenced) bent over said outer race 16, for example by a crimping process, to provide axial and circumferential retention of the seal 22. The axial portion 26a is extended on the side opposite the edge by an annular radial portion 26b extending inward in the direction of the inner race 14 and remaining at a distance from the latter. The radial portion 26b of the flange is situated axially facing the collar 14c of the inner race. An axial space (not referenced) remains between the radial portion 26b of the flange and the collar 14c. In the embodiment shown, the radial portion 26b has a staggered shape so as to increase the stiffness of the flange 26. Alternatively, the radial portion 26 could extend in a purely rectilinear manner.

The gasket 28 may be made of elastomer, such as nitrile rubber, for example. The gasket 28 is molded or vulcanized onto the radial portion 26b of the flange. The gasket 28 includes an annular radial internal heel 28a and an annular sealing lip 28b projecting from said heel on the interior side of the rolling bearing 10. The heel 28a covers the free end of the portion 26d of the flange and the radial front surface of said radial portion situated axially facing the radial portion 14c of the inner race. The heel 28a is situated axially and radially at a distance from the inner race 14. The internal lip 28b extends from an interior edge of the heel 28a. The lip 28b is situated radially between the radial portion 26b of the flange and the axial portion 14b of the inner race. With the inner race 14, the lip 28b provides a dynamic sealing function.

The lip 28b is oriented toward the interior of the rolling bearing 10, i.e. on the same side as the rolling elements 18. The lip 28b extends obliquely downward and comes into rubbing contact with the axial portion 14b of the inner race. The lip 28b is mounted in rubbing contact with the axial exterior surface of the axial portion 14b. The friction contact between the lip 28b and the inner race 14 is radial. The lip 28b is flexible in the radial direction. The free edge of the lip 28b advantageously has in cross section a triangular shape so as to reduce the friction torque between said lip and the inner race 14.

In the embodiment shown, the gasket 28 also includes an annular radial external heel 28c covering in part the radial front surface of the radial portion 26d of the flange oriented in direction of the outer race 16. With the outer race 16 the heel 28c provides a static seal. By "static seal" is meant a seal between two parts having no relative movement. The heel 28c comes axially to bear against the radial edge of the axial portion 16b of the outer race. The heel 28c is pre-stressed axially between the exterior face 16 and the flange 26. The heel 28c tends to resume its initial dimensions and to move the flange 26 axially on the side opposite the outer race 16, which causes clamping of the edge of the flange onto said race. This produces reliable axial retention of the seal 22 on the outer race 16.

The second seal 24 is situated axially on the side opposite the rolling elements 18 and the outer race 16 relative to the first seal 22. The seal 24 is offset axially relative to the seal 22 on the exterior side of the bearing 10. The seal 24 is situated axially between the seal 22 and the front surface of the collar 14c of the inner race forming a support surface for the maneuvering element 12.

The seal 24 includes a gasket 30 made from a flexible material providing a dynamic seal with the seal 22, and a rigid reinforcing insert 32 on which the gasket 30 is disposed and which is provided to reinforce the mechanical strength of said gasket. In the embodiment shown, the reinforcing insert 32 is partially embedded in the interior of the gasket 30. The reinforcing insert 32 is made from a rigid material, for example by pressing, cutting and bending a steel plate or a steel tube. Alternatively, the reinforcing insert 32 may be made from a rigid synthetic material, for example polyamide. The reinforcing insert 32 increases the rigidity of the seal 24 and forms a stiffening armature.

In the embodiment shown, the generally annular reinforcing insert 32 has in cross section a general L-shape. The reinforcing insert 32 includes an annular stiffening portion 32a and an annular stiffening collar 32b. In the example shown, the stiffening portion 32a and the collar 32b are partially embedded in the interior of the gasket 30. Alternatively, the stiffening portion 32a and the collar 32b could be entirely embedded in the interior of the gasket 30. The stiffening portion 32a extends radially and comes axially to bear against the maneuvering element 12. The stiffening collar 32b axially extends a large-diameter edge of the stiffening portion 32a in the direction of the seal 22 while remaining at a distance from the latter.

The gasket 30 may be made of elastomer, such as nitrile rubber, for example. The gasket 30 is molded or vulcanized onto the reinforcing insert 32. The gasket 30 includes an annular heel 30a and an annular sealing lip 30b projecting from said heel in the direction of the seal 22.

Figure 2:
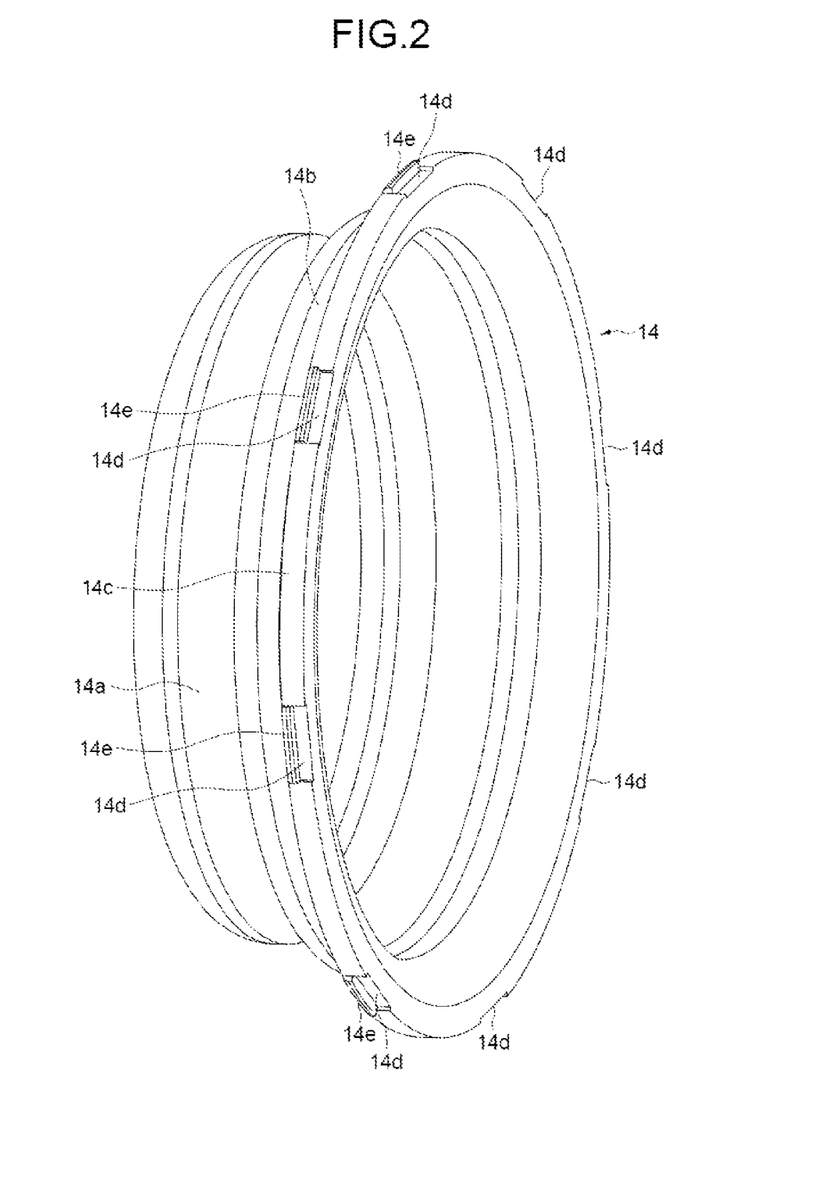
FIG. 2 is a perspective view of an inner race of the bearing from FIG. 1, and FIGS. 3 to 5 are views in axial section of rolling bearings in accordance with second, third and fourth embodiments of the invention.

The heel 30a covers the free end of the stiffening portion 32a of the reinforcing insert, the radial front surface of said portion situated axially on the same side as the seal 22 and also the free end and the bore of the stiffening collar 32b of said insert. The bore of the heel 30a of the gasket includes a plurality of protuberances (not referenced) extending radially toward the interior and spaced apart from one another in the circumferential direction. The protuberances each extend inside a groove 14d formed on the axial exterior surface of the collar 14c of the inner race as shown more visibly in FIG. 2. These protuberances provided on the bore of the seal 24 form anti-rotation means of said seal cooperating with anti-rotation means having a shape complementary to the inner race, i.e. the grooves 14d. The bore of the seal 24 is mounted radially in contact against the axial exterior surface of the collar 14c. The inner race 14 also includes a plurality of lugs 14e each extending the bottom of one of the grooves 14d radially toward the exterior and projecting from the exterior surface of the collar 14c. Each lug 14e delimits a stop surface oriented axially on the side opposite the seal 22 and against which the seal 24 comes axially to bear. In the embodiment shown, the heel 30a of the gasket of the seal 24 comes axially to bear against the radial lugs 14e. The lugs 14e form means for axial retention of the seal 24 on the inner race 14. The lugs 14e may be made by punching, for example. Alternatively, it would be possible to provide, instead of the lugs, an annular bead for performing this function of retention of the seal 24.

With the seal 22, the lip 30b of the seal 24 provides a dynamic sealing function. The lip 30b extends from a large-diameter edge of the heel 30a of the gasket. The lip 30b is oriented axially on the same side as the seal 22. The lip 30b extends obliquely downward and comes into rubbing contact with the radial portion 26b of the sealing flange of the seal 22 axially on the side opposite the rolling elements 18. The lip 30b is mounted in rubbing contact with the front surface of the radial portion 26b of the flange that is situated axially on the side opposite the outer race 16 and the rolling elements 18. The friction contact between the lip 30b and the flange 26 is axial. The lip 30b is flexible in the axial direction. The lip 30b closes the axial space existing between the collar 14c of the inner race and the seal 22. The free end of the lip 30b advantageously has in cross section a triangular shape.

The lip 30b is situated axially on the side opposite the rolling elements 18 and the outer race 16 relative to the seal 22. The lip 30b is situated axially on the side opposite the lip 28b of the seal 22 relative to the radial portion 26b of the flange of said seal. The lip 30b is offset radially toward the exterior of the bearing relative to said lip 28b. The lip 30b situated axially between the seal 22 and the collar 14c of the inner race form beforehand a seal on the upstream side of the lip 28b of the seal 22, which makes it possible to limit polluting particles reaching said lip 28b.

The self-aligning sleeve 25 is advantageously made from synthetic material, for example elastomer or natural rubber. The sleeve 25 includes an annular body 25a mounted in the bore of the inner race 14 in radial contact with said bore and a plurality of ribs 25b parallel to the axis 10a, extending substantially radially toward the interior from the bore of the body 25a and the interior free edge of which comes into contact against the maneuvering element 12. The ribs 25b are deformable radially and allow the bearing 10 to move radially relative to the maneuvering element 12 during a clutch disengagement operation so as to allow the self-alignment of said bearing relative to the clutch diaphragm if the rotation axes of these two elements are not aligned.

The sleeve 25 further includes an annular sealing lip 25c in friction contact with the outer race 16. The lip 25c is in friction contact with the radial portion 16d of the outer race. The contact between the lip 25c and the outer race 16 is axial. The lip 25c extends from an axial edge of the body 25a. Here the lip 25c extends obliquely inward. The lip 25c is disposed axially in the axial free space existing between the inner race 14 and the radial portion 16d of the outer race. The lip 25c allows prevention of intrusion of polluting foreign particles into this area between the inner race 14 and the outer race 16.

The lip 25c of the sleeve is disposed axially on the side opposite the seals 22, 24 relative to the rolling elements 18. The lip 25c of the sleeve in friction contact with the outer race and the lip 28b of the seal 22 in friction contact with the interior ring 14 delimit radially between said races a sealed annular space containing the rolling elements 18. This favors retention of the lubricant introduced into the closed space defined between the races 14, 16 of the bearing.

Moreover, the lip 30b of the seal 24 situated behind the seal 22 axially between the flange 26 of said seal and the collar 14c of the inner race allows limitation of the number of polluting particles reaching the lip 28b of the seal 22. The provision of the seal 24 placed on the upstream side of the seal 22 at the entry of the bearing 10 favors the obtaining of an improved seal.

Figure 3:
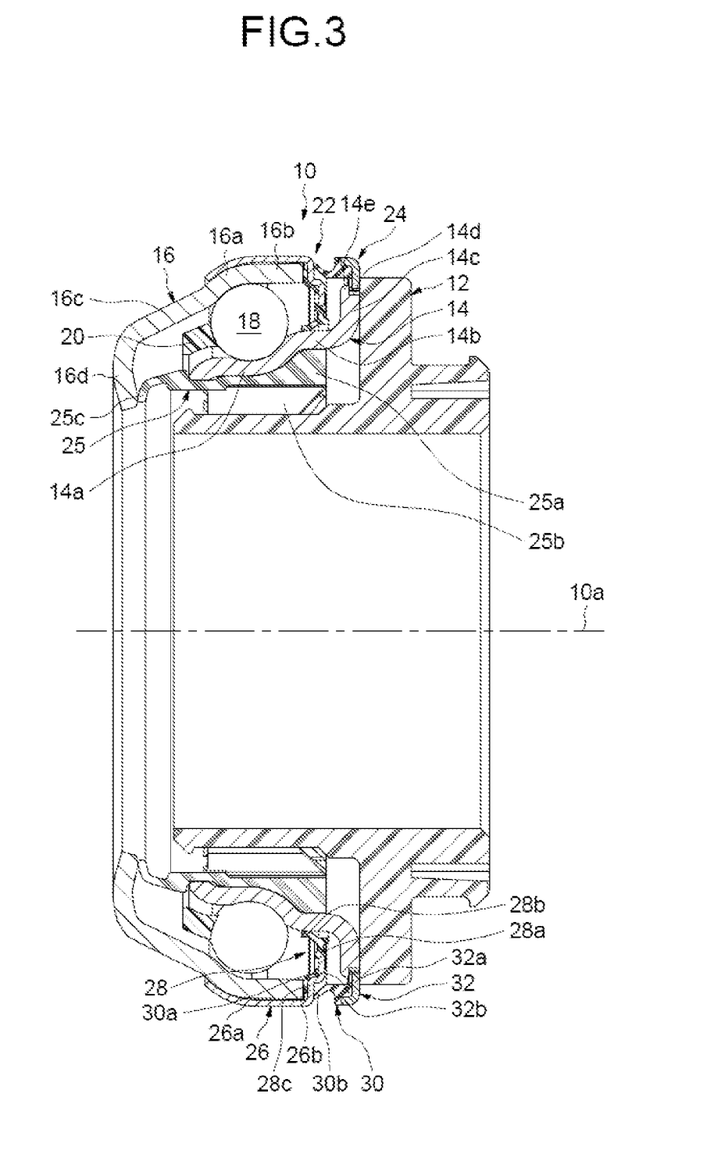

The embodiment shown in FIG. 3, in which identical elements bear the same references, differs from the example described above only in that the lip 30b of the seal 24 extends obliquely upward from a small-diameter edge of the heel 30a. In an identical manner to the first example described, the lip 30b comes into rubbing contact with the flange 26 of the seal 22 axially on the side opposite the rolling elements 18.

Figure 4:
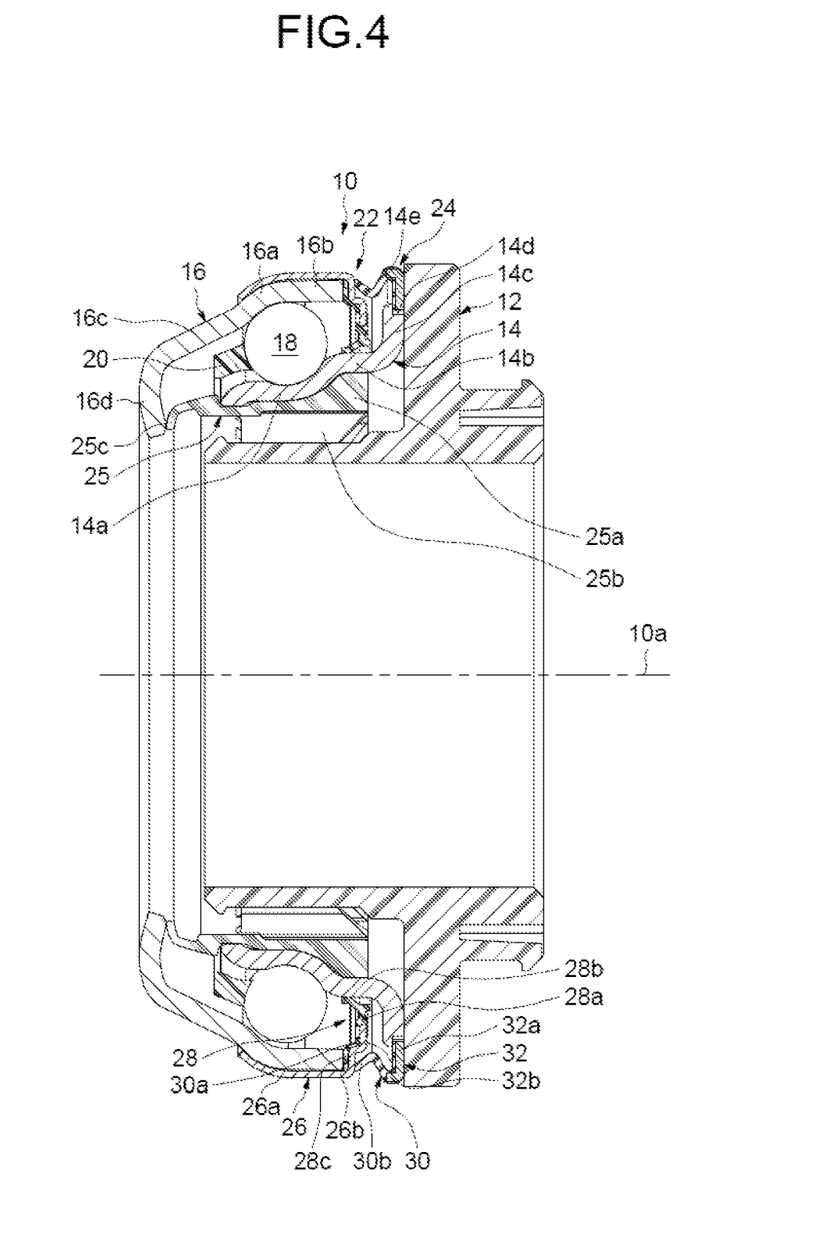

The embodiment shown in FIG. 4, in which identical elements bear the same references, differs from the first embodiment described in that the lip 30b of the seal 24 includes a first oblique part extending downward from the large-diameter edge of the heel 30a, and a second oblique part extending the small-diameter end of the first part and extending upward and rubbing against the flange 26 of the seal 22. The oblique parts of the lip 30b form a wave having in cross section a V-shape oriented radially toward the exterior. This design allows an increase in the axial flexibility of the lip 30b.

Figure 5:
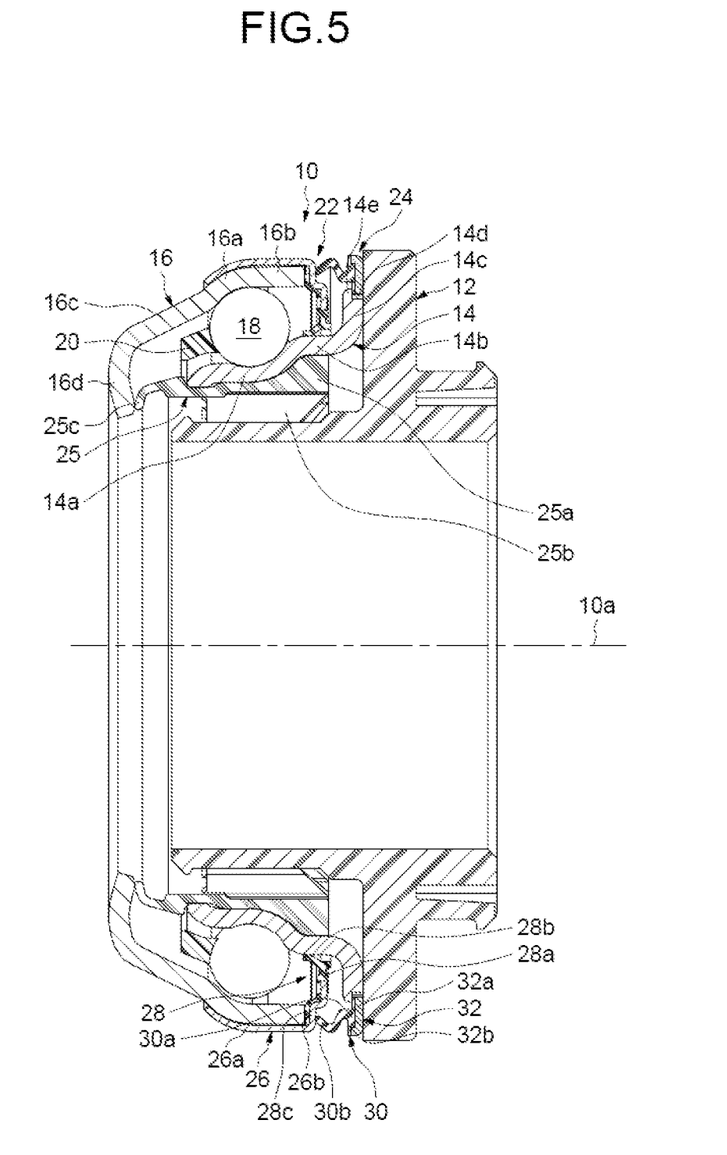

Alternatively, as shown in FIG. 5, in which identical elements bear the same references, the lip 30b of the seal 24 has an inverted orientation with a first oblique part extending upward from the small-diameter edge of the heel 30a, and a second oblique part extending the large-diameter end of the first part and extending downward and rubbing against the flange 26 of the seal 22. The wave formed on the lip 30b has in this case in cross section a V-shape oriented radially toward the interior. In another alternative embodiment, it would be possible to provide a seal 24 including a sealing lip 30b provided with a plurality of successive waves.

In the embodiments described, the lip 30b of the seal 24 is mounted axially in contact against the seal 22. Alternatively, it would be possible to provide radial contact between the lip 30b and the seal 22. For example, the lip 30b of the seal 24 could rub against the rim formed on the radial portion 26b of the flange of the seal 22 and provided to increase the rigidity of said flange.

In the embodiments shown, the lip 30b of the seal 24 rubs. Alternatively, this lip could be of the labyrinth type, i.e. form with the seal 22 a seal by narrow passage(s). In an alternative embodiment, it would also be possible to provide for the seal 22 a lip 28b of the labyrinth type. The seal 22 could also include an additional external sealing lip of the labyrinth or rubbing type.

In another alternative, it would also be possible to replace the annular lip 30b of the seal 24 with a plurality of lips distributed over the circumference of said seal and cooperating with the seal 22. Each of these lips may be in the form of a frustoconical protuberance or projection, for example.

In the embodiments described, the seal 24 includes a flexible gasket and a rigid reinforcing insert which is covered by the gasket. Alternatively, the seal would not include such a reinforcing insert.

In the embodiments shown, the lip of each seal extends from the heel of the associated gasket. Alternatively, each lip could extend directly from the flange or the associated insert, for example being molded onto said flange or insert.

In the embodiments described, the self-centering sleeve includes a lip cooperating through friction with the outer race and disposed axially on the side opposite the seals 22, 24 relative to the rolling elements. Alternatively, it would be possible to provide an additional seal separate from the sleeve and fixed to said sleeve, said seal including a lip cooperating through friction with the outer race or forming a narrow passage with said race. In another variant, the additional seal could be fixed to the outer race and cooperate with the inner race, or vice-versa.

The invention has been illustrated on the basis of a rolling bearing for which the first seal 22 is fixed to the outer race 16 and the second seal 24 cooperating with said first seal is fixed to the inner race 14. Alternatively, it would be possible to provide a bearing with a reversed disposition of the seals, i.e. the first seal 22 fixed to the inner race and the second seal 24 fixed to the outer race and cooperating with said first seal by friction or by (a) narrow passage(s).

Thanks to the invention, a rolling bearing is available having an improved seal thanks to the use of the second seal mounted axially on the same side as the first seal and including at least one lip cooperating with said first seal to limit the intrusion of polluting particles at the entry of the bearing.

The invention claimed is:

1. A rolling bearing including:
   an inner race;
   an outer race;
   at least one row of rolling element disposed between the races;
   at least one first seal fixed to one of the races and including at least one sealing lip cooperating with the other race; and
   at least one second seal fixed to the other race and including at least one sealing lip cooperating with the first seal,
   wherein the sealing lip of the first seal cooperates with a first portion of the other race, the second seal being fixed to a second portion of the other race that is separate from the first portion and situated axially facing the first seal.

2. The rolling bearing according to claim 1, wherein the second seal is situated axially on the side opposite the rolling elements and the race relative to the first seal.

3. The rolling bearing according to claim 1, wherein the first seal further includes a flange on which the sealing lip of the seal is disposed, the sealing lip of the second seal cooperating with the flange of the first seal.

4. The rolling bearing according to claim 3, wherein the flange of the first seal includes one of a radial or substantially radial portion extending in a direction of the other race, the sealing lip of the second seal cooperating with the portion of the flange of the first seal.

5. The rolling bearing according to claim 1, wherein the sealing lip of the second seal cooperates by friction with the first seal.

6. The rolling bearing according to claim 5, wherein the sealing lip of the second seal is mounted one of axially or radially in contact against the first seal.

7. The rolling bearing according to claim 1, wherein the second seal is provided with a flexible gasket including the sealing lip and a rigid reinforcing insert covered at least in part by the flexible gasket.

8. The rolling bearing according to claim 1, wherein the sealing lip of the second seal includes at least one wave.

9. The rolling bearing according to claim 1, further including an additional seal fixed to one of the races and including at least one sealing lip cooperating with the other race and disposed axially on the side opposite the first and second seals relative to the rolling elements.

10. The rolling bearing according to claim 9, further including a self-centering sleeve mounted in the bore of the inner race and including the additional seal.

11. The rolling bearing according to claim 1, wherein the rolling bearing is integrated into a clutch release bearing device.

12. A rolling bearing including:
   an inner race;
   an outer race;
   at least one row of rolling element disposed between the races;
   at least one first seal fixed to one of the races and including at least one sealing lip cooperating with the other race; and
   at least one second seal fixed to the other race and including at least one sealing lip cooperating with the first seal,
   wherein a bore of the second seal includes a plurality of protuberances spaced from one another in a circumferential direction and each extending inside a complementary groove formed on the other race.

13. A rolling bearing including:
   an inner race;
   an outer race;
   at least one row of rolling element disposed between the races;
   at least one first seal fixed to one of the races and including at least one sealing lip cooperating with the other race; and
   at least one second seal fixed to the other race and including at least one sealing lip cooperating with the first seal, wherein the other race further comprising at least one radial lug delimiting a stop surface against which the second seal is mounted to bear axially.

* * * * *